(12) United States Patent
Nakatsuka (10) Patent No.: US 8,693,052 B2
(45) Date of Patent: Apr. 8, 2014

(54) ELECTRONIC DOCUMENT GENERATING APPARATUS, ELECTRONIC DOCUMENT GENERATION METHOD, AND STORAGE MEDIUM

(75) Inventor: Tadanori Nakatsuka, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 341 days.

(21) Appl. No.: 13/163,588

(22) Filed: Jun. 17, 2011

(65) Prior Publication Data

US 2011/0317183 A1    Dec. 29, 2011

(30) Foreign Application Priority Data

Jun. 24, 2010    (JP) .................................. 2010-144119

(51) Int. Cl.
*G06F 3/12* (2006.01)
*H04N 1/40* (2006.01)

(52) U.S. Cl.
USPC ........................... 358/1.9; 358/1.13; 358/1.18

(58) Field of Classification Search
USPC ......................................................... 358/1.9
See application file for complete search history.

(56) References Cited

U.S. PATENT DOCUMENTS

2007/0229872 A1* 10/2007 Kanai ........................ 358/1.13
2009/0262396 A1* 10/2009 Furuya ........................ 358/1.15
2010/0060936 A1* 3/2010 Shitara et al. ................ 358/1.18

FOREIGN PATENT DOCUMENTS

| CN | 1776689 A | 5/2006 |
| CN | 101013417 A | 8/2007 |
| JP | 2001-130082 A | 5/2001 |

* cited by examiner

*Primary Examiner* — Steven Kau
*Assistant Examiner* — Andrew H Lam
(74) *Attorney, Agent, or Firm* — Canon U.S.A., Inc. IP Division

(57) ABSTRACT

An electronic document generating apparatus adds, if the same attribute as an attribute of a layer to be processed of an original electronic document is not stored in a layer attribute DB, the attribute to the layer attribute DB, and analyzes an OBJ of a layer of the page to be processed in the original electronic document, and if the OBJ is an OBJ whose size-reduction is not permitted, stores "reduction-inhibited OBJ: ON" in the layer attribute DB as one of the attributes of the layer, and if the OBJ is an OBJ that includes personal data, stores "personal data: ON" in the layer attribute DB as one of the attributes of the layer, and further performs imposition of the page to be processed in the original electronic document according to the content of the layer attribute DB and an imposition method designated by the user.

9 Claims, 8 Drawing Sheets

| PAGE NUMBER | LAYER ID | DISPLAY | PRINT | STORE | REDUCTION-INHIBITED OBJ | PERSONAL DATA |
|---|---|---|---|---|---|---|
| 1 | 1 | ○ | △ | ○ | × | × |
| 1 | 2 | × | ○ | ○ | × | × |
| 1 | 3 | × | △ | ○ | × | × |
| 1 | 4 | ○ | × | ○ | × | ○ |
| 1 | 5 | × | ○ | ○ | ○ | × |

ELECTRONIC DOCUMENT GENERATING APPARATUS, ELECTRONIC DOCUMENT GENERATION METHOD, AND STORAGE MEDIUM

BACKGROUND OF THE INVENTION

1. Field of the Invention

The present invention relates to an electronic document generating apparatus, an electronic document generation method, and a computer program. More particularly, the present invention relates to an electronic document generating apparatus, an electronic document generation method, and a computer program useful for generating an imposition-completed document from an electronic document including a plurality of pages and a plurality of layers.

2. Description of the Related Art

Conventionally, as a method for printing after imposition is performed, there is a method in which print data (logical pages) generated by application software is imposed in order on physical pages before the user performs printing. For example, Japanese Patent Application Laid-Open No. 2001-130082 discusses a method that joins print jobs together by converting print data into data in intermediate codes before the user performs printing or previews the print data. The printing and the print preview is performed based on layout information of each print job in the joined print jobs.

On the other hand, electronic documents (hereinafter referred to as "documents" as needed) with layers are widely used these days. This is because a document with layers is useful in enhancing efficiency of document generation, reducing time and effort necessary in correcting the document, concealing personal data, embedding information for the printing process, and embedding copy-forgery-inhibited pattern for security.

Various attributes can be set for a layer. They are, for example, "1. display: always OFF/always ON", "2. printing: ON when "display" is ON/always OFF/always ON", and "3. storage: ON when "display" is ON/always OFF/always ON".

However, although an imposition-completed document dedicated for printing can be generated according to the technique discussed in Japanese Patent Application Laid-Open No. 2001-130082, the layer attributes for printing are different from the layer attributes for purposes other than printing such as display and storage. Thus, the generated imposition-completed document cannot be used for display and storage.

Since one imposition-completed document cannot be used for all applications, it is necessary to generate a variety of very similar documents such as an imposition-completed document for printing, an imposition-completed document for display, and an imposition-completed document for storage. This may affect time and effort for document management, possibility of using and incorrect document due to a mix-up between correct and incorrect files, and may also adversely affect the system due to the increase in the size of files that are stored.

SUMMARY OF THE INVENTION

The present invention is directed to an electronic document generating apparatus and an electronic document generation method capable of efficiently generating an imposition-completed document, which can be reused for various purposes, from an electronic document including a plurality of pages and a plurality of layers.

According to an aspect of the present invention, an electronic document generating apparatus configured to generate an imposition-completed document by performing imposition of each page of an electronic document including a plurality of pages and a plurality of layers includes an analyzing unit configured to analyze a drawing object which belongs to a layer to be processed of a page to be processed of the electronic document, a determination unit configured to determine, based on a result of an analysis of the drawing object performed by the analyzing unit, whether the drawing object is a special drawing object set in advance, and an imposition unit configured to perform imposition based on a layer attribute which is determined according to an attribute of the special drawing object, when the determination unit determines that the drawing object is the special drawing object. The layer attribute indicates a processing method for the drawing object which belongs to the layer to be processed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
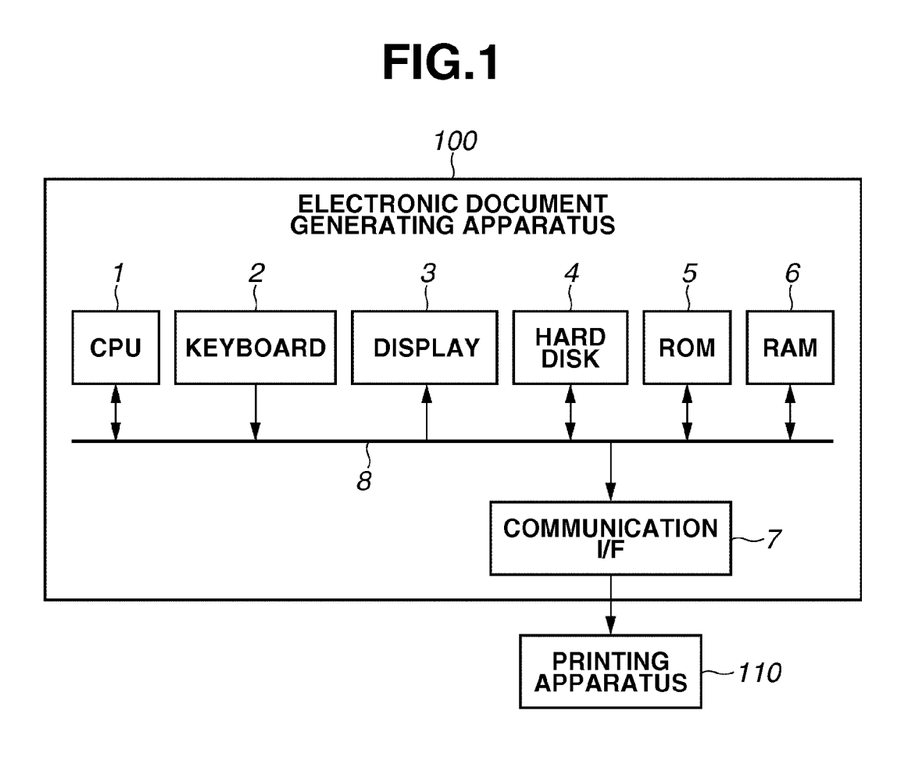
FIG. 1 is a block diagram illustrating a hardware configuration of an electronic document generating apparatus.

FIG. 1 is a block diagram illustrating an example of a hardware configuration of an electronic document generating apparatus.

In FIG. 1, a central processing unit (CPU) 1 controls the overall operation of an electronic document generating apparatus 100. A keyboard 2 is a user interface by which a user inputs data. A display unit 3 displays a document image. A hard disk 4 stores data such as a document or a computer program.

A read-only memory (ROM) 5 stores a computer program used for controlling the electronic document generating apparatus 100 or necessary information in advance. A random access memory (RAM) 6 is used as a work area of the CPU 1. A communication interface (I/F) 7 is used when the electronic document generating apparatus 100 communicates with an external apparatus. A data bus 8 transfers various types of data between the units of the electronic document generating apparatus 100. A printing apparatus 110 prints an imposition-completed document generated by the electronic document generating apparatus 100.

Figure 2:
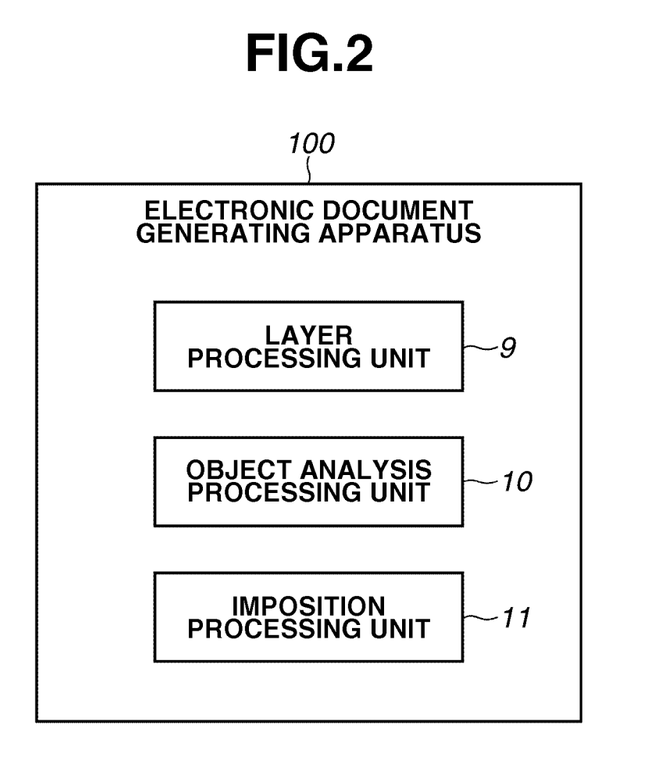
FIG. 2 is a block diagram illustrating a functional configuration of the electronic document generating apparatus.

FIG. 2 is a block diagram illustrating an example of a functional configuration of the electronic document generating apparatus 100. FIG. 2 illustrates only the portions related to the generation of the electronic document (document data), and other portions are not illustrated.

In FIG. 2, a layer processing unit 9 acquires information such as display/non-display information of a drawing object (hereinafter referred to as an "object" as needed) of a layer of an electronic document. An object analysis processing unit 10 analyzes the object. An imposition processing unit 11 performs imposition processing and generates the imposition-completed document.

Figure 3:
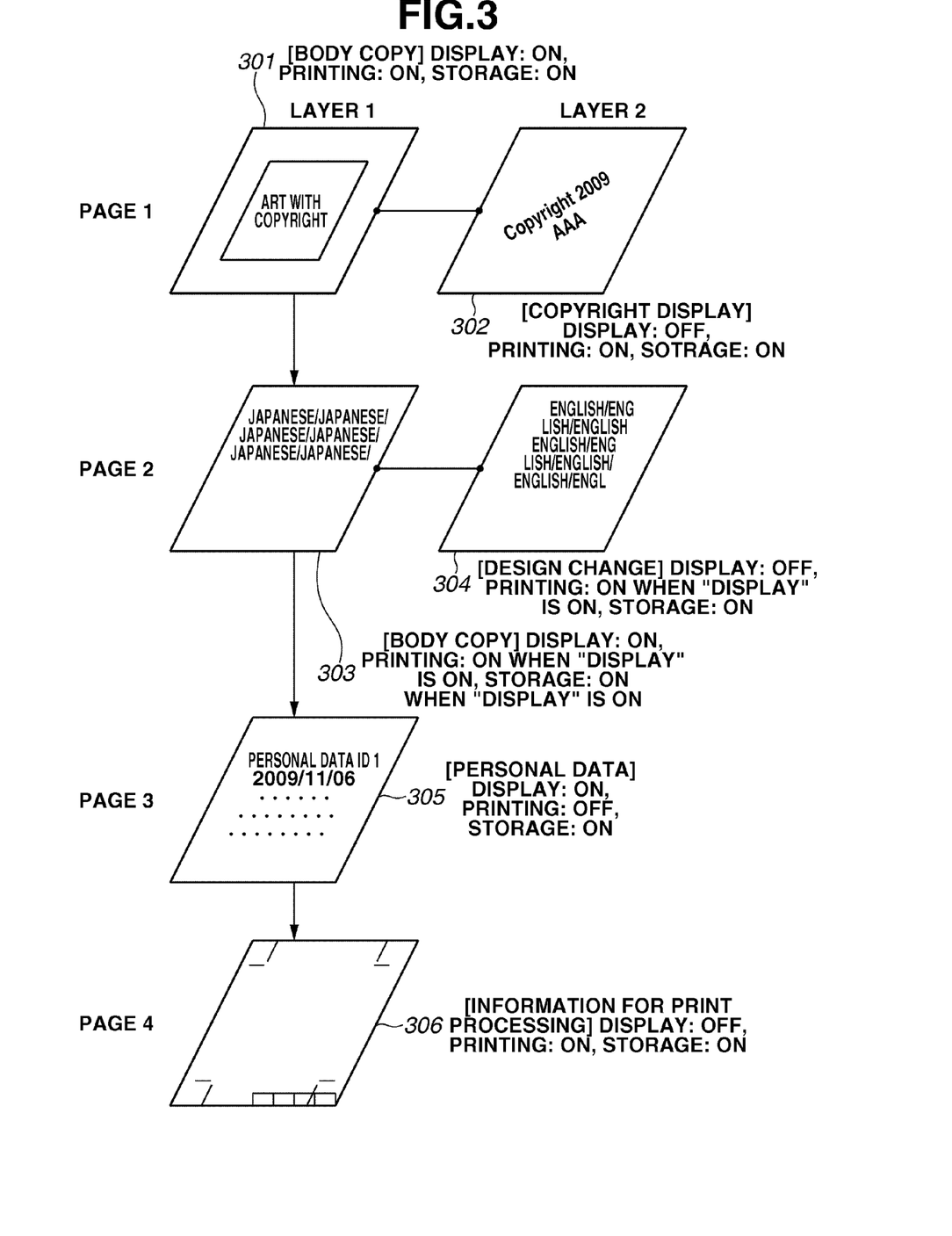
FIG. 3 illustrates a configuration of the electronic document including a plurality of pages and a plurality of layers.

FIG. 3 is a conceptual diagram of an example of the electronic document including a plurality of pages and a plurality of layers. According to the present exemplary embodiment, a case where an imposition-completed document is generated from the electronic document illustrated in FIG. 3 will be described.

In FIG. 3, attributes (layer attributes) are set for each layer of each page of the electronic document. The attributes indicate the processing method of an object (hereinafter referred to as an "OBJ" as needed) of the layer. The attributes of a first layer (layer 301) of a first page (PAGE 1) are: "display: ON", "printing: ON", "storage: ON". Further, the attributes of a second layer (layer 302) of the first page are: "display: OFF", "printing: ON", and "storage: ON".

The attributes of a first layer (layer 303) of a second page (PAGE 2) are: "display: ON", "printing: ON when "display" is ON", and "storage: ON when "display" is ON". Further, the attributes of a second layer (layer 304) of the second page are: "display: OFF", "printing: ON when "display" is ON", "storage: ON when "display" is ON".

The attributes of a first layer (layer 305) of a third page (PAGE 3) are: "display: ON", "printing: OFF", "storage: ON".

The attributes of a first layer (layer 306) of a fourth page (PAGE 4) are: "display: OFF", "printing: ON", "storage: ON".

As described above, the layer attributes of the present exemplary embodiment include display (preview) or non-display of the document on the display unit 3, printing or non-printing of the document by the printing apparatus 110, and storage or non-storage of the document in the hard disk 4.

Next, an example of generation processing of an imposition-completed document will be described with reference to the flowcharts in FIGS. 4 and 5. The imposition-completed document is reusable and generated according to imposition processing of a document having layers.

Figure 4:
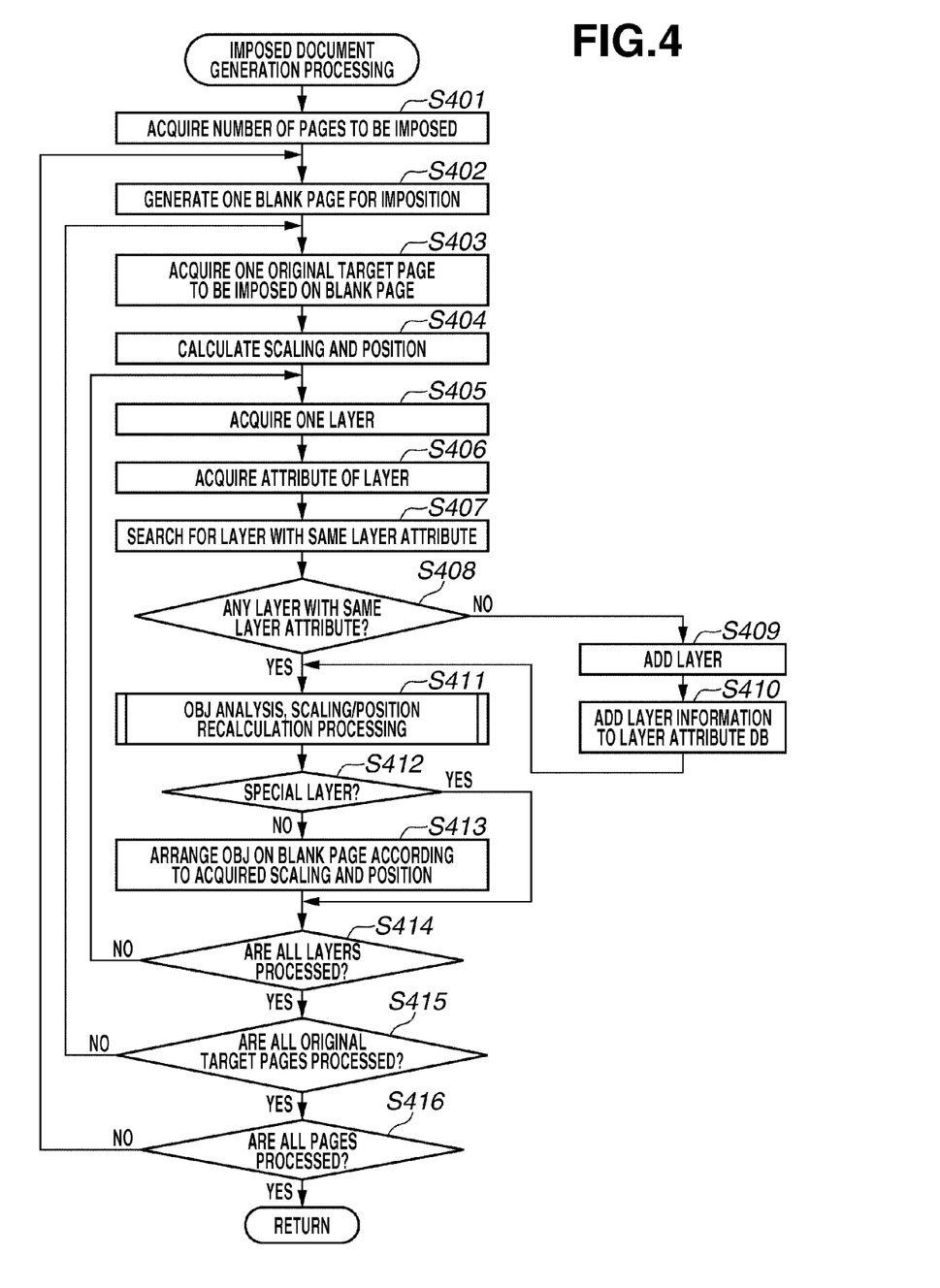
FIG. 4 is a flowchart illustrating generation processing of an imposition-completed document.
Figure 5:
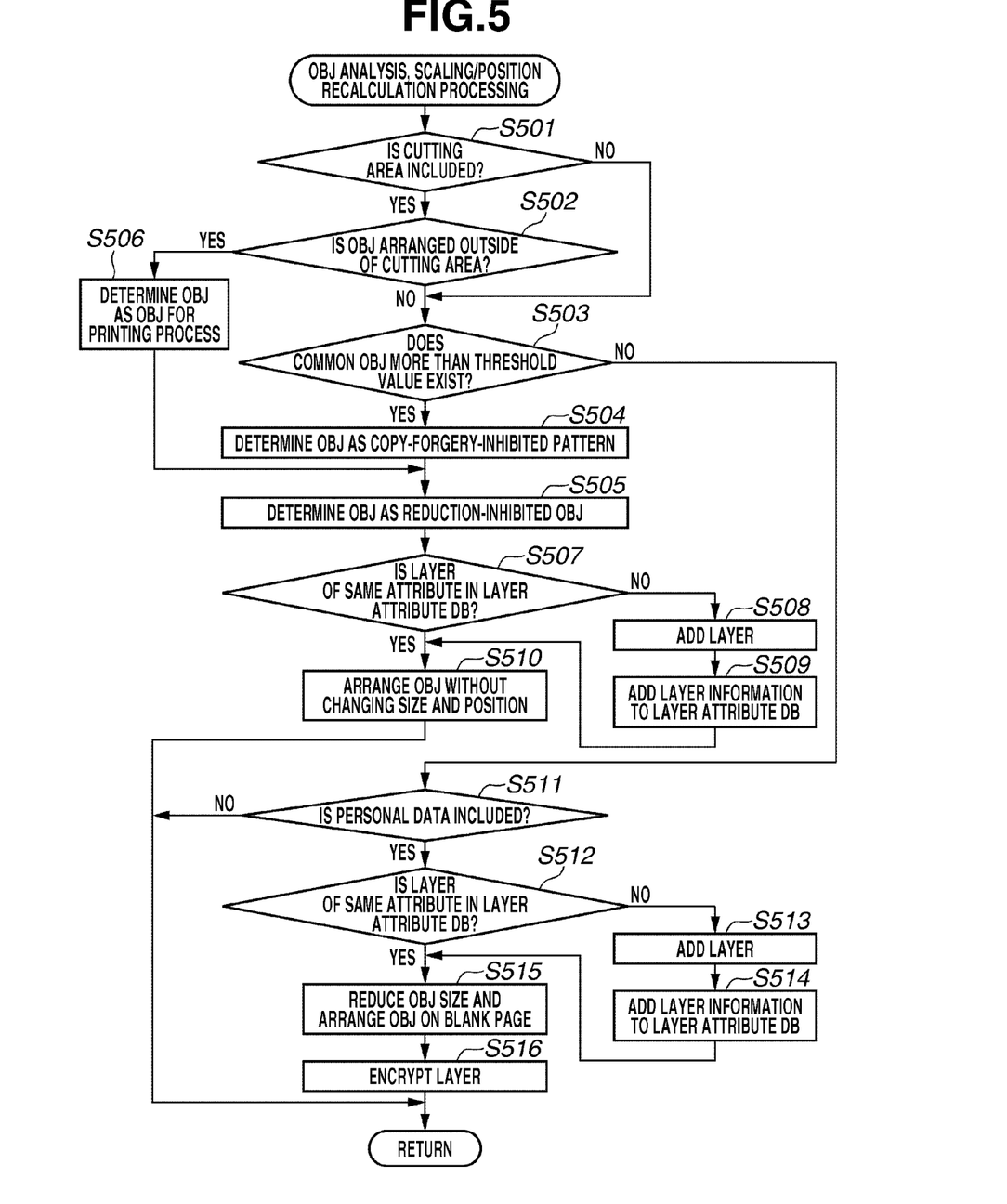
FIG. 5 is a flowchart illustrating details of step S411 in FIG. 4.

The flowchart illustrated in FIG. 4 illustrates an example of the imposition-completed document generation processing. FIG. 5 illustrates an example of step S411 (OBJ analysis, scaling/position recalculation processing) in FIG. 4. The processing illustrated in FIGS. 4 and 5 is realized by the CPU 1 executing a computer program, for example, stored in the ROM 5.

In step S401, the imposition processing unit 11 acquires information regarding the number of pages to be arranged on one page of a document to be generated based on the user's instruction. Regarding the case described in FIG. 4, four pages of the electronic document will be arranged on one page of the document to be generated (4-up layout).

In step S402, the imposition processing unit 11 generates one blank page to be used for the imposition. The size of the object of each page of the original electronic document is reduced and arranged on the blank page so that 4-up layout is realized.

In step S403, the imposition processing unit 11 acquires information of one page of the original target pages to be imposed on one page of the imposition-completed document (one page out of the pages of the original electronic document to be imposed on one page of the imposition-completed document). According to the example illustrated in FIG. 3, the acquisition is started from the layers 301 and 302 of the first page.

In step S404, the imposition processing unit 11 calculates the scaling of the acquired page and the position of the acquired page after the imposition. Since 4-up layout is to be realized, the scaling will be 50% both in height and in width. Further, the layers 301 and 302 of the first page of the electronic document after the imposition are positioned at the upper left side of the page since they are taken from the first page. Positions of the second page and later of the original electronic document are arranged at positions instructed by the user.

For example, the second page of the original electronic document can be arranged on the upper right side or the lower left side of the page. In step S405, the layer processing unit 9 acquires one layer out of the layers of the page acquired in step S403. According to the example illustrated in FIG. 3, the first layer (layer 301) of the first page is acquired. In step S406, the layer processing unit 9 acquires the attributes of the layer acquired in step S405. According to the example illustrated in FIG. 3, the attributes of the layer 301 are "display: ON", "print: ON", and "storage: ON".

In step S407, the layer processing unit 9 accesses a layer attribute database (layer attribute DB) 601 and searches for a layer whose attribute is the same as the attribute of the layer acquired in step S406.

Figure 6:
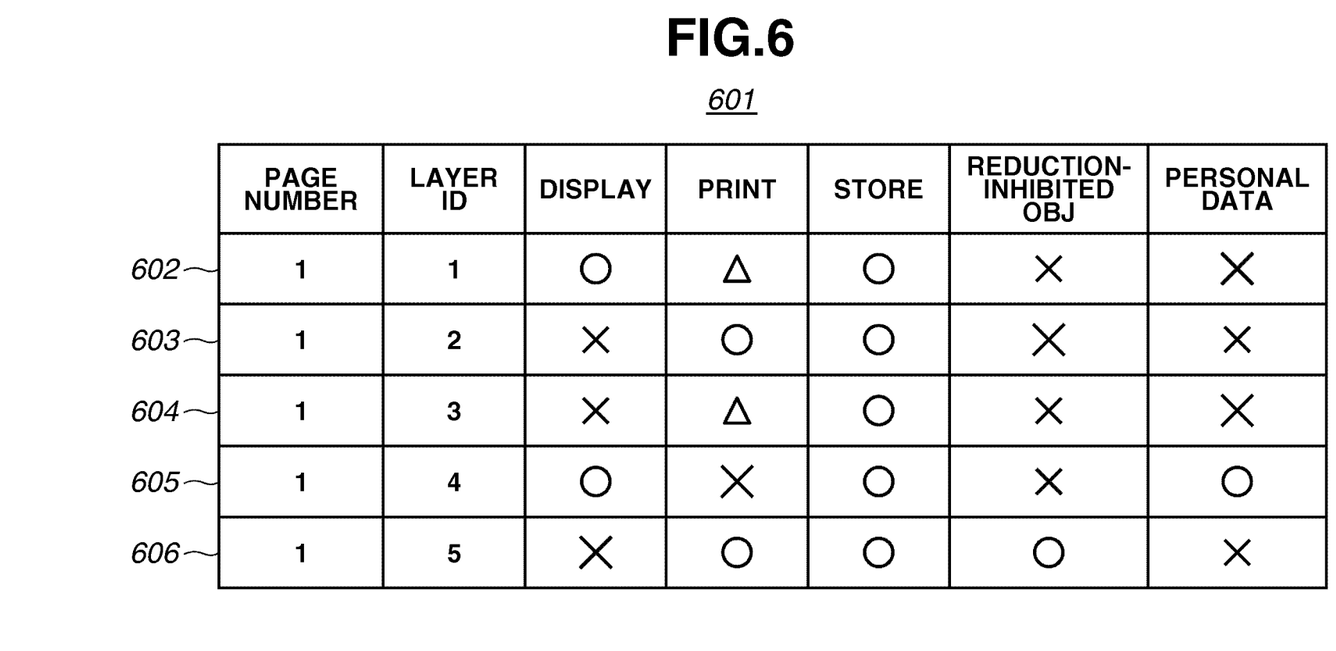
FIG. 6 illustrates an example of a layer attribute database.

FIG. 6 illustrates an example of the layer attribute DB 601. According to the example illustrated in FIG. 6, page information, layer ID, display information, print information, storage information, reduction-inhibited OBJ information, and personal data are associated to one another as layer attributes and stored in the layer attribute DB 601.

The chart in FIG. 6 illustrates the layer attribute DB 601 generated after all the processing regarding the documents in FIG. 3 is completed. In other words, for example, when the first layer (layer 301) of the first page goes under the processing in step S407, no attribute information is in the layer attribute DB 601.

As described above, the display information is information regarding whether the display (preview) operation on the display unit 3 is permitted, the print information is information regarding whether the printing operation by the printing apparatus 110 is permitted, and storage information is information regarding whether the storage in the hard disk 4 is permitted. Further, according to the present exemplary embodiment, the reduction-inhibited OBJ information and the personal data is stored as layer information. The reduction-inhibited OBJ information is information regarding whether the reduction of the size of the OBJ is inhibited or not, and personal data is information regarding whether personal data is included or not.

In FIG. 6, "o" (circle) denotes "ON (YES)", "Δ" (triangle) denotes "ON" when "display" is "o", and "X" denotes "OFF (NO)".

In step S408, the layer processing unit 9 determines whether a layer whose attribute is the same as the attribute of the layer acquired in step S406 is included in the layer attribute DB 601 based on the result of the search for the layer attribute DB 601. If a layer whose attribute is the same as the attribute of the layer acquired in step S406 is included (YES in step S408), the processing proceeds to step S411. On the other hand, if a layer whose attribute is the same as the attribute of the layer acquired in step S406 is not included (NO in step S408), the processing proceeds to step S409.

According to the example illustrated in FIG. 3, when the first layer (layer 301) of the first page is processed, since the layer attribute DB 601 does not include any information, the processing proceeds to step S409.

In step S409, since a layer with the same layer attribute is not included in the page of the imposition-completed document, the layer processing unit 9 adds the layer to the layer attribute DB 601. In step S410, the layer processing unit 9 adds the layer attribute information acquired in step S406 to the layer attribute DB 601.

Regarding the first layer (layer 301) of the first page illustrated in FIG. 3, the attributes of a record 602 illustrated in FIG. 6 is added to the layer attribute DB 601. In other words, attributes such as "imposition-completed document page number: 1", "layer ID: 1", "display: ON", "printing: "ON when "display" is ON", "storage: ON", "reduction-inhibited OBJ: OFF", and "personal data: OFF" are added to the layer attribute DB 601.

Then the processing proceeds to step S411. In step S411, the object analysis processing unit 10 performs the OBJ analysis and scaling/position recalculation processing.

Next, an example of the operation of the object analysis processing unit 10 performed in step S411 will be described in detail with reference to the flowchart in FIG. 5.

First, the analysis of the OBJ is performed. In step S501, the object analysis processing unit 10 determines whether a cutting area is included in the layer to be processed of the original electronic document. If a cutting area is included in the layer to be processed of the original electronic document (YES in step S501), the processing proceeds to step S502. If a cutting area is not included in the layer to be processed of the original electronic document (NO in step S501), the processing proceeds to step S503.

According to the example illustrated in FIG. 3, the first layer (layer 306) of the fourth page includes a cutting area. Thus, if the processing in step S411 is performed for the first layer (layer 306) of the fourth page, it is determined in step S501 that a cutting area is included in a layer to be processed of the original electronic document. On the other hand, if the processing of step S411 is performed for the layers 301 to 305, it is determined in step S501 that a cutting area is not included in a layer to be processed of the original electronic document.

In step S502, the object analysis processing unit 10 determines whether an OBJ is arranged outside of the cutting area. If the OBJ is arranged outside of the cutting area (YES in step S502), the processing proceeds to step S506. If the OBJ is not arranged outside of the cutting area (NO in step S502), the processing proceeds to step S503.

According to the example illustrated in FIG. 3, a registration mark and a color bar used in the printing process are arranged outside of the cutting area in the first layer (layer 306) of the fourth page. Thus, when the processing performed in step S411 is performed for the first layer (layer 306) of the fourth page, it is determined in step S502 that an OBJ is arranged outside of the cutting area.

In step S506, the object analysis processing unit 10 determines that the OBJ arranged outside of the cutting area is an OBJ for the printing process. When the processing in step S506 ends, the processing proceeds to step S505. In step S505, the object analysis processing unit 10 determines that the OBJ (OBJ for the printing process) arranged outside of the cutting area is a reduction-inhibited OBJ.

As described above, if it is determined that the cutting area is not included in the layer to be processed of the original electronic document in step S501 (NO in step S501) or if an OBJ is not arranged outside of the cutting area instep S502 (NO in step S502), then the processing proceeds to step S503. In step S503, the object analysis processing unit 10 determines whether an OBJ being a copy-forgery-inhibited pattern is included in the layer to be processed of the original electronic document.

In other words, in step S503, the object analysis processing unit 10 determines whether the number of the common OBJs used in the same page (layer) is greater than or equal to the threshold value. If the number of the common OBJs used on the same page (layer) is greater than or equal to the threshold value (YES in step S503), the processing proceeds to step S504. If not (NO in step S503), the processing proceeds to step S511 described below.

In step S504, the object analysis processing unit 10 determines that the OBJ included in the layer to be processed of the original electronic document is a copy-forgery-inhibited pattern. For example, if 100 or more dots of the same size are arranged on the same page (layer), it is determined that the dot pattern is a copy-forgery-inhibited pattern. In step S505, the object analysis processing unit 10 determines the OBJ, which has been determined as a copy-forgery-inhibited pattern, as a reduction-inhibited OBJ.

In step S507, the object analysis processing unit 10 searches the layer attribute DB 601 for a layer of the same attribute and determines whether such layer is included in the same page. If a layer of the same attribute is included in the same page (YES in step S507), the processing proceeds to step S510. If a layer of the same attribute is not included in the same page (NO in step S507), the processing proceeds to step S508.

In step S508, the object analysis processing unit 10 adds the layer to the layer attribute DB 601 and determines that the attributes of the layer are "reduction inhibition: ON", "display: OFF", "printing: ON", "storage: ON", and "personal data: OFF". In step S509, the object analysis processing unit 10 writes the attribute information of the layer added to the layer attribute DB 601 in step S508 to the layer attribute DB 601.

In step S510, the object analysis processing unit 10 arranges the OBJ included in the layer to be processed of the original electronic document on the blank page (the page generated in step S402) without reducing its size and without changing the position (the same position as the position in the original electronic document).

This is because if an OBJ for the printing process, such as the one illustrated in the first layer (layer 306) of the fourth page in FIG. 3, has its size reduced, as are other OBJs, and imposed, then the registration mark in the OBJ will be useless (see region 804 in FIG. 8 described below). Further, since the copy-forgery-inhibited pattern will not work when its size is reduced, according to the present exemplary embodiment, the copy-forgery-inhibited pattern is also arranged without having its original size and original position changed.

When the processing in step S510 is completed, the processing of the flowchart in FIG. 5 ends, and the processing proceeds to step S412 in FIG. 4 described below.

Referring back again to step S503, if the number of the common OBJs on the same page (layer) is less than the threshold value (NO in step S503), the processing proceeds to step S511.

In step S511, the object analysis processing unit 10 determines whether personal data is included in the layer to be processed of the original electronic document. For example, if a file that contains a database of addresses is prepared and stored, by determining whether a text that matches the database is included in the OBJ, the existence of the personal data can be determined.

As a result of the determination, if personal data is included in the layer to be processed of the original electronic document (YES in step S511), the processing proceeds to step S512. If personal data is not included in the layer to be processed of the original electronic document (NO in step S511), the flowchart in FIG. 5 ends, and the processing proceeds to step S412 in FIG. 4, to be described below.

In step S512, the object analysis processing unit 10 searches the layer attribute DB 601 for a layer of the same attribute and determines whether such layer is included in the same page. If a layer of the same attribute is included in the same page (YES in step S512), the processing proceeds to step S515. If a layer of the same attribute is not included in the same page (NO in step S512), the processing proceeds to step S513.

In step S513, the object analysis processing unit 10 adds the layer to the layer attribute DB 601 and determines that the attributes of the layer are "personal data: ON", "display: ON", "printing: OFF", "storage: ON", and "reduction-inhibition: OFF". In step S514, the object analysis processing unit 10 writes the attribute information of the layer added to the layer attribute DB 601 in step S513 to the layer attribute DB 601. Then, the processing proceeds to step S515.

In step S515, the object analysis processing unit 10 reduces the size of the OBJ included in the layer to be processed of the original electronic document and arranges the reduced OBJ on the blank page (the page generated in step S402). The reduction ratio and the position of the OBJ are calculated in step S404.

In step S516, the object analysis processing unit 10 encrypts the layer to be processed of the original electronic document so that only the persons who have the authority to see the layer of the personal data can see the layer. Then, the processing of the flowchart in FIG. 5 ends, and the processing proceeds to step S412 in FIG. 4.

In step S412, the imposition processing unit 11 determines whether the layer to be processed of the original electronic document is a special layer, (i.e., a layer that includes a special OBJ). A special OBJ is set in advance and receives arrangement in step S411. According to the present exemplary embodiment, the special object can be any of an OBJ for the printing process, an OBJ of a copy-forgery-inhibited pattern, or an OBJ of personal data. The special object, however, is not limited to such objects. For example, the special object can be an OBJ whose scaling/position is different from a normal OBJ such as the body text.

If the layer to be processed of the original electronic document is a special layer (YES in step S412), since the arrangement of the OBJ is finished in step S411, the processing proceeds to step S414. On the other hand, if the layer to be processed of the original electronic document is not a special layer (NO in step S412), the processing proceeds to step S413.

In step S413, the imposition processing unit 11 arranges the OBJ on the blank page generated in step S402 according to the scaling/position calculated in step S404.

In step S414, the imposition processing unit 11 determines whether processing of all the layers of the same page are performed by the layer processing unit 9. If all the layers of the same page are not processed yet (NO in step S414), the processing returns to step S405, and the processing in steps S405 to S414 is repeated until the processing of all the layers of the same page is completed.

Then, if the processing of all the layers of the same page is completed (YES in step S414), the processing proceeds to step S415. According to the example of the first page illustrated in FIG. 3, if the processing of both of the layers 301 and 302 is completed, the processing proceeds to step S415.

In step S415, the imposition processing unit 11 determines whether the processing of all the original target pages included in one page of the imposition-completed document is completed. If processing of all the original target pages included in one page of the imposition-completed document is not completed yet (NO in step S415), the processing returns to step S403, and the processing in steps S403 to S415 is repeated until processing of all the original target pages included in one page of the imposition-completed document is completed. If processing of all the original target pages included in one page of the imposition-completed document is completed (YES in step S415, the processing proceeds to step S416.

According to the example illustrated in FIG. 3, since a document of 4-up layout is generated, when processing of the first to the fourth pages of the original electronic document is completed, the processing proceeds to step S416.

In step S416, the imposition processing unit 11 determines whether the processing of all the pages of the original electronic document is completed. If the processing of all the pages of the original electronic document is not completed yet (NO in step S416), the processing returns to step S402, and the processing in steps S402 to S416 is repeated until the processing of all the pages of the original electronic document is completed. On the other hand, if processing of all the pages of the original electronic document is completed (YES in step S416), the processing (imposition-completed document generation processing) of the flowchart in FIG. 4 ends.

Figure 7:
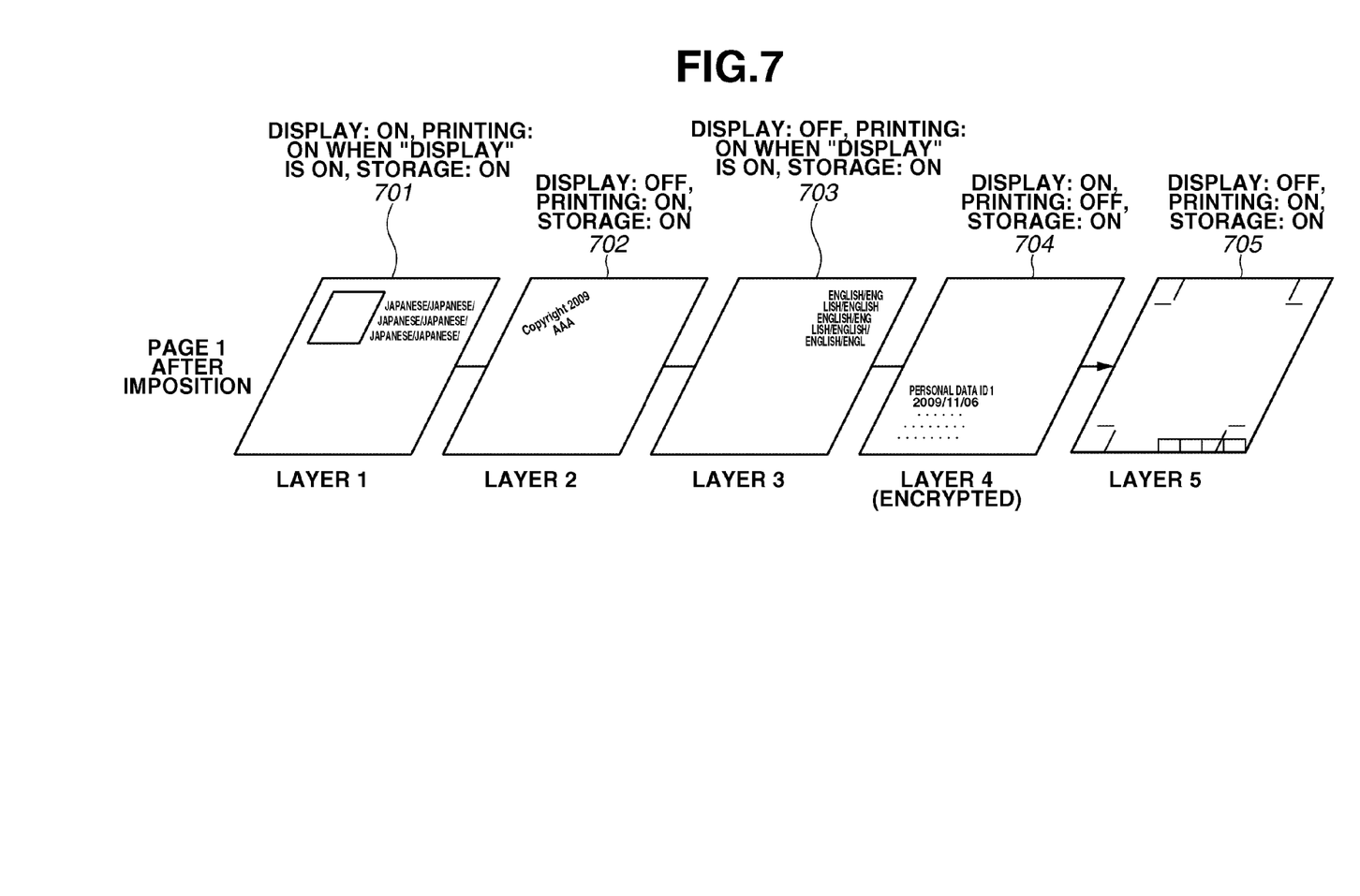
FIG. 7 illustrates the imposition-completed document generated according to an exemplary embodiment of the present embodiment.

FIG. 7 conceptually illustrates a first page of a 4-up imposition-completed document obtained by realizing 4-up layout of the electronic document illustrated in FIG. 3 according to the method of the present exemplary embodiment.

In FIG. 7, the attributes of a first layer (layer 701) of the first page after the imposition are: "display: ON", "printing: ON when "display" is ON, and "storage: ON". The attributes of a second layer (layer 702) of the first page after the imposition are: "display: OFF", "print: ON", and "storage: ON".

The attributes of a third layer (layer 703) of the first page after the imposition are: "display: OFF", "printing: ON when "display" is ON", and "storage: ON". The attributes of a fourth layer (layer 704) of the first page after the imposition are: "display: ON", "printing: OFF", "storage: ON", and "encryption: ON".

The attributes of a fifth layer (layer 705) of the first page after the imposition are: "display: OFF", "printing: ON", and "storage: ON". Thus, in the end, layers 701 to 705 having different attributes are obtained.

The attributes of these layers correspond to layer IDs 1 to 5 (records 602 to 606) in the layer attribute DB 601 illustrated in FIG. 6.

Figure 8:
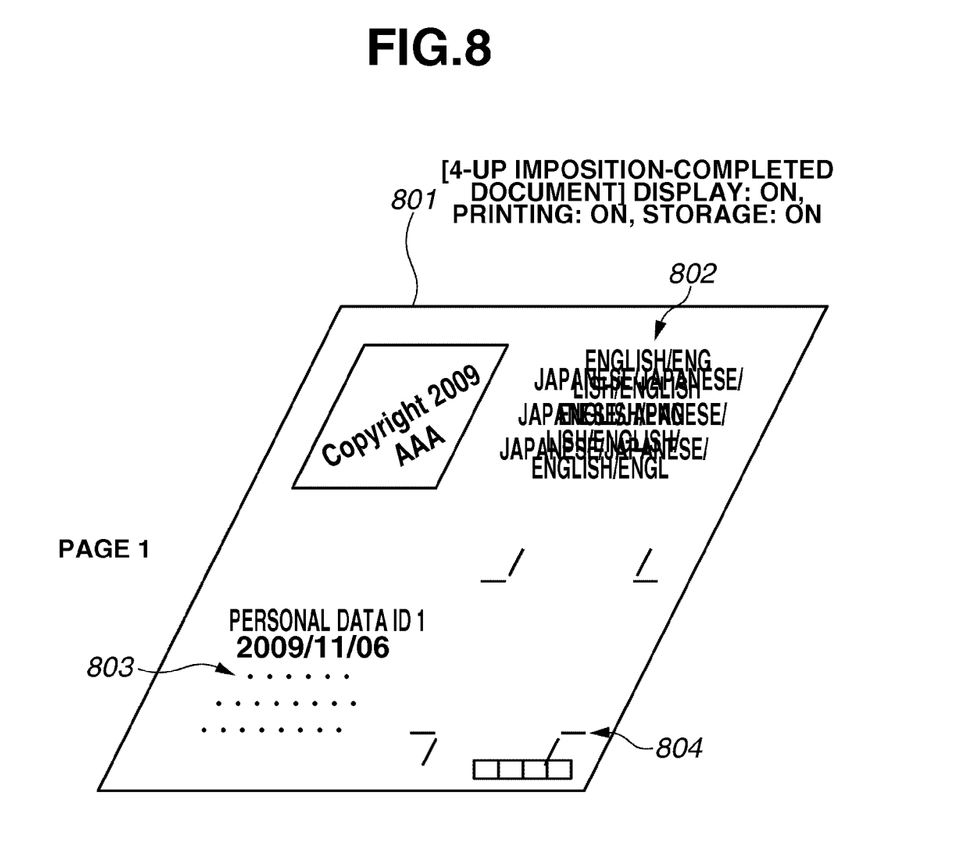
FIG. 8 illustrates the imposition-completed document generated by ignoring layer attributes.

FIG. 8 is a conceptual diagram of the first page of the 4-up imposition-completed document obtained by realizing 4-up layout of the electronic document illustrated in FIG. 3 without considering the layer attributes.

As illustrated in FIG. 8, if an imposition-completed document is generated without considering the layer attributes of the original electronic document, an object that should not be displayed is displayed, and an object that should not be printed is printed and the design cannot be changed.

In other words, in FIG. 8, since a region 802 on the upper right side of a 4-up imposition-completed document 801 corresponds to the second page of the original electronic document, content in Japanese and content in English should be displayed after changing the layers. However, the Japanese content and the English content are mixed in the region 802.

Further, since a region 803 on the lower left side corresponds to the third page of the original electronic document, the OBJ of the third page includes personal data and thus should not be printed. However, the OBJ is printed in the region 803. This will cause security concerns.

Further, since a region 804 on the lower right side corresponds to the fourth page of the original electronic document, and the registration mark and the color bar used for the printing process should not be displayed on the imposition-completed document. However, the registration mark and the color bar are actually displayed. Further, although the registration mark and the color bar are objects whose size should not be reduced, they are reduced together with other content.

Further, if an imposition-completed document is generated by arranging all the layers of each page of the original electronic document on the page after the imposition to which the page belongs, the number of layers of the same imposition-completed page will be equal to a total number of "layers of the page imposed on the same page of the original electronic document". Thus, processing time regarding display and printing, time and effort necessary in editing such as changing designs, and increased file size are concerns in generating the document.

For example, according to the example illustrated in FIG. 3, a total of six layers taken from the first to the fourth pages of the original electronic document are arranged on the first page of the imposition-completed document. In some cases, documents including 100 to 1000 pages are printed. Thus, it is very important to efficiently generate the imposition-completed documents.

According to the present exemplary embodiment, if the same attribute as the attribute of the layer of the page of the processing object of the original electronic document is not stored in the layer attribute DB 601, the attribute is added to the layer attribute DB 601.

Further, when the OBJ of the layer of the page to be processed of the original electronic document is analyzed, and if the OBJ is an OBJ whose size should not be reduced, the attribute "reduction-inhibited OBJ: ON" is stored in the layer attribute DB 601 as one of the attributes of the layer.

Further, if the OBJ includes personal data, the attribute "personal data: ON" is stored in the layer attribute DB 601 as one of the attributes of the layer. Then, according to the content of the layer attribute DB 601 and the imposition method designated by the user, imposition of the page to be processed of the original electronic document is performed.

Thus, even if the original electronic document includes various layers and objects, an imposition-completed document which can be reused for various purposes can be automatically generated, and further, a document of a smallest file size can be generated. Further, time and effort necessary in the correction can be reduced by using the embodiment. The correction is, for example, manually deleting a layer unnecessary in the processing at a later time and changing layout of objects or scaling. Further, security can be improved by using the embodiment.

According to the present exemplary embodiment, a case where the electronic document generating apparatus 100 is a host computer is described. However, if the functions of the layer processing unit 9, the object analysis processing unit 10, and the imposition processing unit 11 are performed by the printing apparatus 110, the printing apparatus 110 can function as the electronic document generating apparatus.

Next, a second exemplary embodiment of the present invention will be described. According to the first exemplary embodiment, a plurality of OBJs included on the same layer of the original electronic document are arranged at the same scaling/position on the same layer of the imposition-completed document in steps S411 to S413 in FIG. 4.

According to the present exemplary embodiment, a plurality of OBJs included on the same layer of the original electronic document can be arranged on different layers of the imposition-completed document. In other words, a plurality of OBJs included on the same layer of the original electronic document can be arranged on the imposition-completed document by a different scaling or at a different position.

For example, although the layer 306 in FIG. 3 includes only the OBJ for the printing process, content (e.g., body text) having the same attributes as the attributes of the OBJ for the printing process ("display: OFF", "printing: ON", "storage: ON") can be included in the layer 306. In this case, the OBJ outside of the cutting area is not reduced when it is arranged, and the OBJ in the cutting area such as the body text is reduced when it is arranged.

With the configuration described above, in addition to the effect described in the first exemplary embodiment, the present exemplary embodiment can be applied to various layers and objects of the original electronic document compared to the first exemplary embodiment. Since processing of the present exemplary embodiment other than the processing described immediately above is similar to the processing of the first exemplary embodiment, detailed description of such processing is not repeated.

The above-described exemplary embodiments are merely examples of the present invention and shall not be construed as limiting the technical range of the present invention. In other words, the present invention can be realized in diverse ways so long as it is in accordance with the technological thought or main features of the present invention.

According to the present invention, if a drawing object of a layer of the original electronic document is a special drawing object, imposition of the drawing object is performed according to a layer attribute whose content is set in advance according to the attribute of the drawing object. Thus, an imposition-completed document which can be reused for various purposes can be efficiently generated.

Embodiments of the present invention can also be realized by a computer of a system or apparatus (or devices such as a CPU or micro-processing unit (MPU)) that reads out and executes a program of computer executable instructions recorded on a memory device to perform the functions of the above-described embodiments, and by a method, the steps of which are performed by a computer of a system or apparatus by, for example, reading out and executing the program recorded on the memory device to perform the functions of one or more of the above-described embodiments. For this purpose, the program may be provided to the computer for example via a network or from a recording medium of various types serving as the memory device (e.g., computer-readable medium). The recording medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. Such a system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-144119 filed Jun. 24, 2010, which is hereby incorporated by reference herein in its entirety.

What is claimed is:

1. An electronic document generating apparatus configured to generate an imposition-completed document by performing imposition of each page of an electronic document including a plurality of pages and a plurality of layers, the apparatus comprising:
an analyzing unit configured to analyze a drawing object which belongs to a layer to be processed of a page to be processed in the electronic document;
a determination unit configured to determine, based on a result of an analysis of the drawing object performed by the analyzing unit, whether the drawing object is a special drawing object set in advance; and
an imposition unit configured to perform imposition based on a layer attribute which is determined according to an attribute of the special drawing object, when the determination unit determines that the drawing object is the special drawing object, and
wherein the layer attribute indicates a processing method for the drawing object which belongs to the layer to be processed, and wherein the layer attribute includes information indicating whether display on a display device is permitted, whether printing on a printing apparatus is permitted, and whether storage in a storage medium is permitted.

2. The electronic document generating apparatus according to claim 1, further comprising:
a storage unit configured to store, when the same layer attribute as a layer attribute of the layer to be processed is not stored in a database where a layer attribute of a layer of each page of the imposition-completed document is recorded, the layer attribute in the database,
wherein the imposition unit performs, based on a layer attribute of a layer stored in the database, imposition of a drawing object which belongs to the layer,
wherein the storage unit stores, when the same layer attribute as a layer attribute of a layer to which the special drawing object belongs is not stored, a layer attribute whose content is set in advance according to an attribute of the drawing object, in the database.

3. The electronic document generating apparatus according to claim 1, wherein the determination unit determines whether the drawing object is a drawing object whose size-reduction is not permitted, based on the result of the analysis of the drawing object performed by the analyzing unit,
wherein the layer attribute includes information indicating whether size-reduction of the drawing object is permitted,
wherein the imposition unit performs imposition without size-reduction with regards to the drawing object whose size-reduction is not permitted.

4. The electronic document generating apparatus according to claim 1, further comprising:
an encryption unit configured to encrypt information of the layer,
wherein the determination unit determines whether the drawing object is a drawing object including personal data based on the result of the analysis of the drawing object performed by the analyzing unit,
wherein the layer attribute includes information indicating whether personal data is included,
wherein the encryption unit encrypts information of a layer to which the drawing object including the personal data belongs.

5. An electronic document generating method for generating an imposition-completed document by performing imposition of each page of an electronic document including a plurality of pages and a plurality of layers, the method comprising:
analyzing a drawing object which belongs to a layer to be processed of a page to be processed in the electronic document;
determining, based on a result of an analysis of the drawing object performed by the analyzing unit, whether the drawing object is a special drawing object set in advance; and
performing imposition based on a layer attribute which is determined according to an attribute of the special drawing object, when the determining step determines that the drawing object is the special drawing object, and
wherein the layer attribute indicates a processing method for the drawing object which belongs to the layer to be processed, and wherein the layer attribute includes information of whether display on a display device is permitted, whether printing by a printing apparatus is permitted, and whether storage in a storage medium is permitted.

6. The electronic document generating method according to claim 5, further comprising:
storing, when a same layer attribute as a layer attribute of the layer to be processed is not stored in a database where a layer attribute of a layer of each page of the imposition-completed document is recorded, the layer attribute in the database;
performing imposition, based on a layer attribute of a layer stored in the database, of a drawing object which belongs to the layer;
storing, when the same layer attribute as a layer attribute of a layer to which the special drawing object belongs is not stored, a layer attribute whose content is set in advance according to an attribute of the drawing object, in the database.

7. The electronic document generating method according to claim 5, further comprising:
determining whether the drawing object is a drawing object whose size-reduction is not permitted, based on a result of analyzing the drawing object;
wherein the layer attribute includes information indicating whether size-reduction of the drawing object is permitted, and
performing imposition without size-reduction with regards to the drawing object whose size-reduction is not permitted.

8. The electronic document generation method according to claim 5, further comprising:
encrypting information of the layer;
determining whether the drawing object is a drawing object including personal data based on the result of the analysis of the drawing object;
wherein the layer attribute includes information indicating whether personal data is included, and
encrypting information of a layer to which the drawing object including the personal data belongs.

9. A non-transitory storage medium storing a computer-executable program for causing a computer to execute a method of generating an imposition-completed document by performing imposition of each page of an electronic document including a plurality of pages and a plurality of layers, the method comprising:
- analyzing a drawing object which belongs to a layer to be processed of a page to be processed in the electronic document;
- determining, based on a result of an analysis of the drawing object performed by the analyzing unit, whether the drawing object is a special drawing object set in advance; and
- performing imposition based on a layer attribute which is determined according to an attribute of the special drawing object, when the determining step determines that the drawing object is the special drawing object, and
- wherein the layer attribute indicates a processing method for the drawing object which belongs to the layer to be processed, and wherein the layer attribute includes information of whether display on a display device is permitted, whether printing by a printing apparatus is permitted, and whether storage in a storage medium is permitted.

* * * * *